Figure 1:
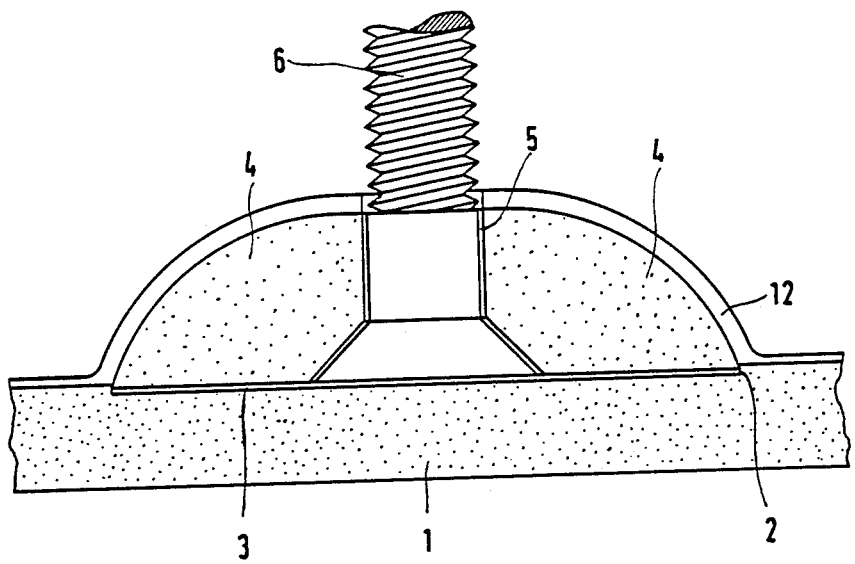

United States Patent [19]

Cremer et al.

[11] Patent Number: 4,821,478
[45] Date of Patent: Apr. 18, 1989

[54] LARGE-FORMAT CERAMIC TILE WITH HOLDING ELEMENTS PROVIDED ON THE SIDE FACING AWAY FROM ITS VISIBLE SIDE

[75] Inventors: Gottfried Cremer, Cologne; Martin Bard, Amberg, both of Fed. Rep. of Germany

[73] Assignee: Buchtal Gesellschaft mit beschrankter Haftung, Fed. Rep. of Germany

[21] Appl. No.: 56,644

[22] Filed: Jun. 1, 1987

[51] Int. Cl.⁴ .............................................. E04F 13/08
[52] U.S. Cl. ....................................... 52/384; 52/386; 52/511
[58] Field of Search ................. 52/384, 386, 511, 235, 52/506; 110/338, 339, 336

[56] References Cited

FOREIGN PATENT DOCUMENTS 22666 9/1882 Fed. Rep. of Germany .
461224 5/1922 Fed. Rep. of Germany .

*Primary Examiner*—Carl D. Friedman
*Attorney, Agent, or Firm*—Kinney & Lange

[57] ABSTRACT

The present invention is an improvement for large-format ceramic tiles, each of which has holding elements provided on their non-visible sides. The improvement includes attaching the holding elements to joining points determined according to static requirements by means of a ceramic glaze, whose thermal expansion coefficient is at least approximately equal to that of the ceramic tile.

19 Claims, 4 Drawing Sheets

LARGE-FORMAT CERAMIC TILE WITH HOLDING ELEMENTS PROVIDED ON THE SIDE FACING AWAY FROM ITS VISIBLE SIDE

The present invention relates to a large-format ceramic tile with holding elements provided on the side facing away from its visible side.

It is known to attach holding elements to the back of ceramic tiles by means of organic adhesives or cement adhesives with organic binders. However, such adhesives age relatively quickly and, in particular, the state of aging cannot be checked optically due to the holding elements being disposed on the side facing away from the visible side.

When such tiles are used as an outer lining for facades, for example, only a format of 0.1 m² at the most, e.g. 30×30 cm, is therefore allowed.

It is also part of the prior art to attach ceramic tiles for lining facades or the like at the edge with the aid of clamp-like elements overlapping the edge. The edge support allows only for relatively small formats, e.g. 60×60 cm, since load can only be carried off via the attachment points situated unfavorably, in terms of statics, at the edge, i.e. there are very high tension peaks with the pointwise load removal occurring in the case of clamp holding.

It is possible in practice to attach such tiles strictly using mortar, but this cannot create back-aired and/or thermally insulated facings. Also, any damaged tiles can only be replaced with great effort.

Thus, using the known attachment methods, no large-format tiles can be employed whose use would actually lead to a more attractive and expedient facing or lining, even if the relative thin large-format ceramic tiles produced by the application are used which have dimensions up to 125×180 cm with a thickness of 8 mm and are still relatively light due to their thinness.

The invention is based on the problem of providing a tile whose holding elements ensure that the requirements for statically stable attachment of the tile are met, regardless of how the tile must be oriented on the basis of the constructional conditions in the room.

The solution to this problem consists according to the invention in attaching the holding elements to joining points determined according to static requirements by means of a ceramic glaze whose thermal expansion coefficient is at least approximately equal to that of the ceramic tile.

With such a tile the attachment problem can be solved very easily. The same thermal expansion coefficient of the glaze establishing the bond and of the tile material prevents cracks from occurring in the case of temperature fluctuations. Such cracks are dangerous in particular in the case of facings exposed to atmospheric conditions because rain which penetrates the cracks impairs the bond and the effect of frost can even burst it.

The holding elements may be fired ceramic elements which serve as such to attach the tile directly or to receive one metal attachment means each. In the latter case, one is then completely free when selecting the material for the attachment means.

It is already known from DE-A-22 666 to apply a coating of glaze after drying to one side of tiles made of good porous clay and then lay them two by two on top of each other with the glazed surface so as to create a double tile. The double tiles are fired, the individual tiles being joined together by the glaze. However, the individual tiles are not fired tiles but green tiles which are coated with glaze on one side after drying and laid on top of each other, the tiles and the glaze thus being subjected to a firing process.

It is also known from German Pat. No. 461 224 to permanently connect ceramic objects, in particular insulator parts and the like, by providing interruptions in the connecting surfaces of the two parts to be fused during firing. But this type of fusion serves only to give the bond elasticity against mechanical stress in spite of the bond created by the fusion. The fusing material is evidently applied to the green objects before firing.

If, in a further embodiment of the invention, a glaze is used which has a melting point below the quartz transition point (573° C.), the fired ceramic tile provided with the corresponding fired holding elements having been once again heated to a temperature below the quartz transition point, the inventive principle can also be applied to tiles having a surface glaze since the latter does not suffer when the tile provided with the holding elements is fired again, since its melting point is not reached.

In order to avoid heating the entire tile to the melting temperature of the glaze, it is proposed in a further embodiment of the invention to embed in the ceramic glaze a flat element having openings, capable of being connected to a power source and made of a metal material having a high specific electrical resistance, whose melting point is far above the melting point of the ceramic glaze and whose thermal expansion coefficient is approximately equal to that of the ceramic glaze. In this way, it is possible to heat only the glaze and the attachment element and the tile locally in the area of the applied glaze, still obtaining the desired fused bond between the tile and the attachment element. "Flat element" refers not only to a sheet-like element but also to a network or a grid, provided that enough openings are present which can be penetrated by the glaze.

Materials having the required properties and also a ratio of electrical resistance at 600° C. to the electrical resistance at 20° C. which is greater than 2, are commercially available, e.g. under the trade name VACON, and are offered as sealing alloys for electronic tubes. The holding elements may be provided with recesses or bores to receive metal attachment means, which considerably facilitates the attachment of the inventive tile designed in this way to a framework or the like. These metal attachment means are of course also directed through the kiln during the second firing for connecting the ceramic holding elements and the ceramic tile by aid of the ceramic glaze. The attachment means cannot be impaired in the kiln because this second firing temperature is relatively low. Centric load removal is reliably obtained by the resulting form closure between the ceramic holding element and the metal attachment means.

The second firing can of course also be carried out without such metal attachment means if the recess or bore is designed in such a way as to allow for metal attachment means to be subsequently introduced into the holding elements. Such attachment means may, for example, be straddling dowels, stop pins, spacers or the like.

The invention may also be realized in such a way that the holding element itself forms the attachment means and can be connected as such to a power source. It is then made of a metal material having a high specific electrical resistance, whose melting point is far above the melting point of the ceramic glaze and whose thermal expansion coefficient is approximately equal to that of the ceramic glaze.

What was said above in connection with the flat element also applies to the material used.

In a further embodiment of the invention, the tile is slightly depressed, for example by loops, at the joining points of the holding elements in the area corresponding to the plan form of these elements. This leads to an additional locking of the ceramic holding elements in the direction of the tile plane during the production of the inventive ceramic tile.

Instead of a depression being provided in the side of the tile facing away from its visible side, the holding elements can alternatively have a depression on the surface coming in contact with this side of the tile. This leaves an annular web-like surface which preferably does not rest on the tile but is spaced a minimal distance therefrom. This gap is sealed by a non-aging adhesive made of a sealing material resistant to atmospheric influences applied after the firing serving to create the bond.

The invention thus provides a tile capable of being attached directly to walls, ceilings, holding racks or the like, the joining points being freely selectable according to static points of view. In one embodiment, the tile and holding elements, and optionally the attachment means, are made of the same material; thus, a homogeneous part is obtained. This leads to the same thermal expansion coefficient and the same strength properties in the area where the holding elements are attached. Even if the attachment means is made of metal, this does not alter the formation of a homogeneous body consisting of the tile and the holding element. The other embodiment involves the advantage that the ceramic holding element may be dispensed with.

Since the bond between the holding element or attachment means and the tile is effected via the glaze in a temperature range which is lower than the quartz transition point, both the holding element or attachment means and the ceramic tile, as well as the glaze applied to the visible side of the ceramic tile, remain completely unchanged. The holding elements or attachment means are not located on the edge but in those parts on the side of the tile facing away from the visible side which yield the statically best possibilities of attachment. The edge areas remain completely unaffected by the holding of the tile, so that the disadvantages involved in edge attachment are fundamentally avoided. Thus, it is possible in static terms, to pass from a two-point mounting, as exists in the case of edge attachment, to a multi-point mounting. The size and shape of the base of the ceramic holding element or attachment means can be selected in such a way that the tension peaks which occur in the mounting points do not exceed the tensions in the central area of the field, i.e. in the center of the field limited by the attachment points.

Since it cannot always be ruled out that the tiles on outside facades are exposed to effects coming from the outside, such as the impact of stones or the like, it may be necessary to provide the side of the tile facing away from the visible side with an anti-breakage coating. This anti-breakage coating must cover at least the entire length of parts of a tile so that in the case of damage the parts of the tile cannot be detached from their formation and fall onto the ground.

It may be advantageous to have the coating also include the area of the holding elements and cover them as well because the permanency of the ceramic bond may be jeopardized by an attack by acid caused atmospherically.

This anti-breakage coating preferably consists of a woven or non-woven fabric of mineral fiber, preferably glass fiber, which is impregnated with an epoxy resin.

In particular when such an anti-breakage coating is used, it is expedient, in a further embodiment of the invention, to design the holding elements not as sharp-edged right parallelipeds or cylinders, but in a dome shape.

If there is no anti-breakage coating but one wants to protect the area of the holding elements permanently from a possible atmospheric attack by acid, it may also be advantageous, in a further embodiment of the invention, to provide the side of the tile facing away from the visible side, at least covering the area of the holding elements, with a coating impermeable to air and water, e.g. a silicon coating, or to fill the part of the holding element serving to receive the metal attachment means with a sealing, water-repellent, infusibly hardening material after the firing serving to connect the holding element, attachment means and tile.

A further solution to this problem consists in ensuring that acidic rain or moisture can immediately flow out of the area of the ceramic bond. This is preferably effected by the aid of channel-like recesses which extend in at least one direction, preferably in four directions perpendicular to each other, from the edge of the holding element in the part intended to receive the metal attachment means.

The drawing shows four embodiments in four figures.

In FIG. 1, 1 refers to the ceramic tile, which has at 2 on its side facing away from the visible side a depression with a circular plan form, for example, the binder being loaded in this depression in the form of a ceramic glaze 3. On this glaze there is a ceramic holding element 4 which, in the embodiment shown, has for example a bore 5 into which a metal attachment means, here in the form of a screw 6, has been inserted before ceramic holding element 4 was put in place. With the aid of this screw 6 the ceramic tile can be attached to a substructure (not shown). The drawing shows particularly clearly that ceramic tile 1 can also be suspended from a ceiling. The connection of the tile to its carrier, e.g. a substructure, is completely concealed from the observer, i.e. the appearance of the facing is completely unaffected.

Figure 2:
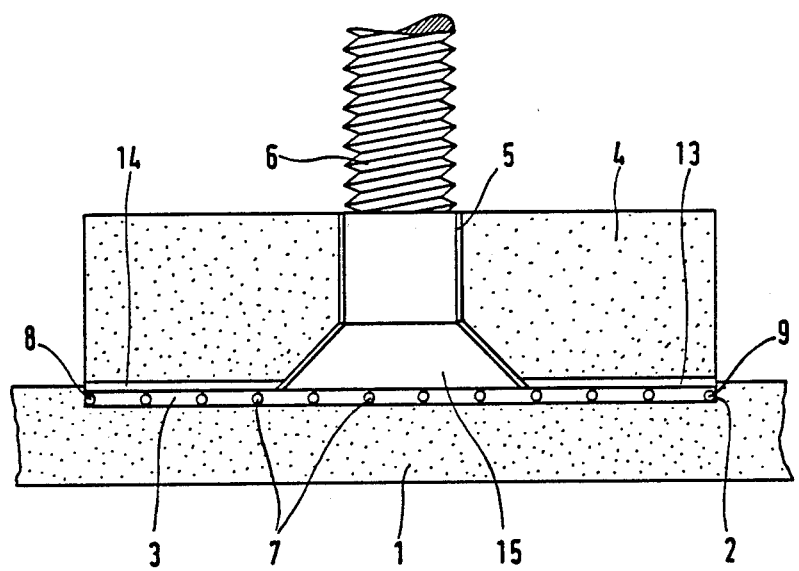

In FIG. 2 identical parts are referred to by identical reference numbers. A flat formation, e.g. in the form of a grid, made of a metal material with high electrical resistance is indicated at 7 in cross-section, being embedded in glaze 3 and subjected to electric current via connections 8 and 9 so as to be heatable higher than the melting temperature of the glaze. 13 and 14 refer to channels, grooves or other recesses which connect the space around head 15 of metal attachment means 6 with the area outside ceramic holding element 4, so that moisture which has penetrated can flow off again undisturbed. Preferably, four channels or the like perpendicular to each other are provided.

Figure 3:
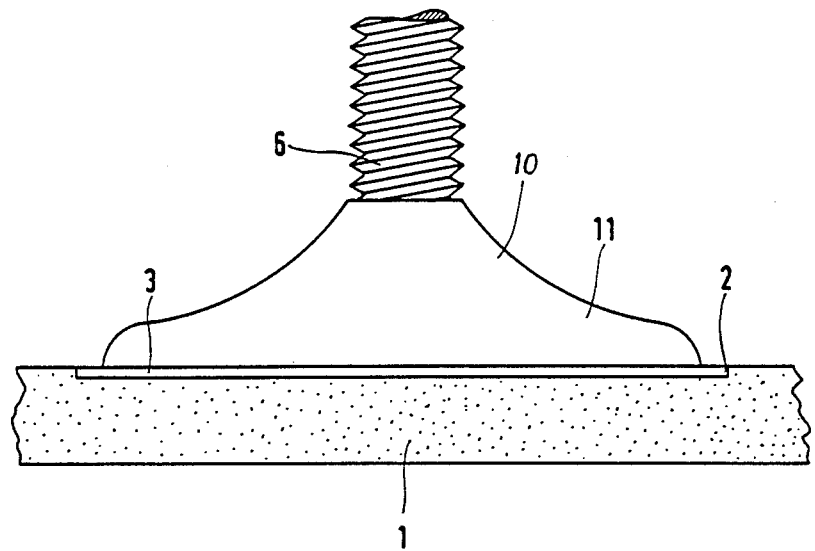

In FIG. 3, 1 also refers to the ceramic tile, 2 to a depression with a circular plan form, for example, and 3 to the ceramic glaze. The ceramic holding element is omitted here. Instead, the attachment means, which is referred to here as 10, has a widened portion 11 which fits into depression 2. Attachment means 10 is made of a material having a high specific electrical resistance and is capable of being connected to a power source in a manner not shown, thus being heatable to a temperature higher than the melting temperature of the glaze.

Figure 4:
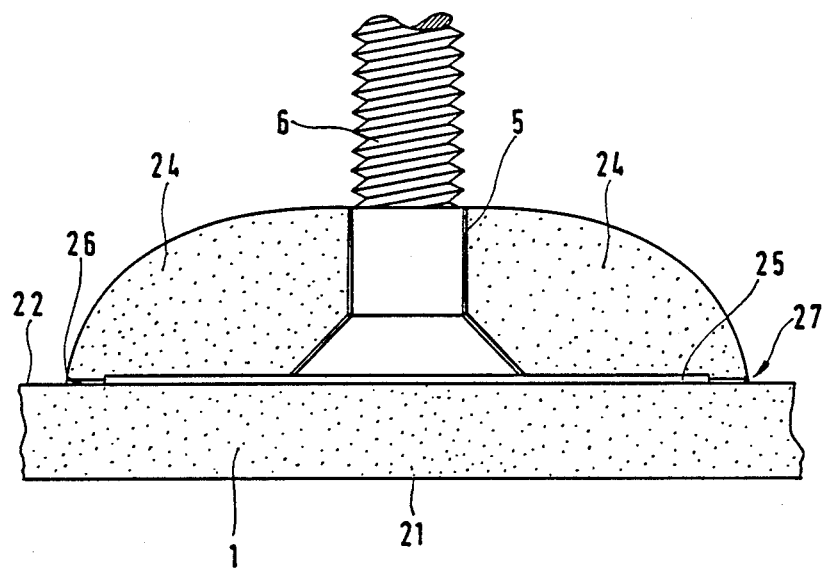

FIG. 4 shows a somewhat modified embodiment, similar to that according to FIG. 1. This variant is of course also possible with the embodiments according to FIGS. 2 and 3 if adapted accordingly.

In FIG. 4, reference number 1 again refers to the ceramic tile, whose surface 22 facing away from visible side 21 is flat in this case, i.e. has no depression. Placed on this surface 22 is a ceramic holding element 24 which corresponds in its essential shape, for example, to holding element 4 according to FIG. 1. However, unlike holding element 4, holding element 24 has a depression 25 surrounded by a web-like edge 26. An attachment means in the form of a screw 6 is inserted in central bore 5 as in the embodiment according to FIG. 1. The space gained by depression 25 is filled with ceramic glaze as a binder. Holding element 24 and tile 1 are connected by this binder in the manner already described by a second firing. The remaining area surrounding depression 25, i.e. web-like edge 26, is spaced a small distance from surface 22 of tile 1, leaving a gap 27. Via this gap 27 web-like edge 26 is connected with surface 22 of the tile by means of a non-aging adhesive made of a sealing material resistant to atmospheric influence, which is introduced after the second firing serving to connect tile 1 and holding element 24, thus giving the bond created via the glaze located in depression 25 particularly good protection against atmospheric influence.

An expert can readily recognize that, and how, this principle can also be applied to the embodiment according to FIGS. 2 and 3.

As mentioned, glaze 3 preferably has a melting point below the quartz transition point, the fired ceramic tile provided with the corresponding holding elements having been heated once again to a temperature lower than the quartz transition point.

The proposed ceramic bond may possibly not have the necessary permanency against atmospheric attack by acid. Therefore, it is expedient for an anti-breakage coating 12 to be provided, as shown in FIG. 1, on the side of the tile facing away from the visible side at least in the area of holding elements 4 according to FIGS. 1 and 2, or 11 according to FIG. 3, covering them as well. This anti-breakage coating consists of a woven or non-woven fabric of mineral fiber, preferably glass fiber, which is impregnated with an epoxy resin. This not only increases the tile's security against breakage, it also in particular protects the entire compound body from atmospheric influences.

If the anti-breakage coating is replaced by a coating made of a material which is impermeable to air and water and/or water-repellent, this does not alter the design of the construction, so that it has not been shown in an additional figure.

FIG. 1 shows a design of a holding element 4 which makes it particularly easy to apply such an anti-breakage coating. One can see the dome-shaped design of holding element 4.

We claim:

1. A large-format ceramic tile with holding elements provided on its side facing away from a visible side thereof, characterized by the attachment of the holding elements (4, 24) to the tile at joining points determined according to static requirements by means of a ceramic glaze (3) whose thermal expansion coefficient is at least approximately equal to that of the ceramic tile (1).

2. The tile according to claim 1, characterized in that the holding elements (4, 24) are fired ceramic elements serving to receive a metal attachment means (6).

3. The tile according to claim 2, characterized in that the holding elements (4, 24) are provided with a recess or bore (5) for receiving a metal attachment means (6).

4. The tile according to claim 3, characterized in that the attachment means (6) are each integrated in form-fitting fashion into the ceramic holding elements (4).

5. The tile according to claim 3, characterized in that the holding elements (4) are provided with channels (13, 14) extending radially outward from the bore in at least one direction.

6. The tile according to claim 5, characterized in that selected channels are aligned perpendicularly relative to one another.

7. The tile according to claim 1 characterized in that the glaze (3) has a melting point below the quartz transition point, the fired ceramic tile (1) provided with the corresponding holding elements (4, 24) having been heated once again to a temperature below the quartz transition point.

8. The tile according claim 1, characterized in that a flat element (7) having openings and capable of being connected to a power source is embedded in the ceramic glaze (3), the flat element (7) is made of a metal material having a high specific electrical resistance, the metal material has a melting point which is far above the melting point of the ceramic glaze (3) and the metal material has a thermal expansion coefficient which is approximately equal to that of the ceramic glaze (3).

9. The tile according to claim 8, characterized in that the ratio of the electrical resistance of the metal material selected for the flat element (7) at a temperature of 600° C. to the electrical resistance of the metal material at 20° C. is greater than 2.

10. The tile according to claim 1, characterized in that the attachment element (10, 11) can itself be connected to a power source and is made of a metal material having a high specific electrical resistance, the metal material has a melting point which is far above the melting point of the ceramic glaze (3) and the metal material has a thermal expansion coefficient which is approximately equal to that of the ceramic glaze (3).

11. The tile according to claim 10, characterized in that the ratio of the electrical resistance of the metal material at a temperature of 600° C. to the electrical resistance of the metal material at 20° C. is greater than 2.

12. The tile according to claim 1, characterized in that the tile (1) is slightly depressed (at 2) at the joining points where the tile is attached to the holding elements (4, 10, 11) in an area corresponding approximately to a plan form of these elements.

13. The tile according to claim 1, characterized in that the holding elements (24) have a depression (25) on the surface coming in contact with the side (22) of the tile (1) facing away from the visible side (21).

14. The tile according to claim 13, characterized in that the holding element (24) has a web-like edge (26) surrounding the depression (25) which is connected permanently to the side (22) of the tile (1) facing away from the visible side (21) by a non-aging adhesive made of a sealing material resistant to atmospheric influences applied after the firing serving to connect the tile (1) and the holding element (24).

15. The tile according to claim 1, characterized in that the side of the tile (1) facing away from the visible side is provided with an anti-breakage coating (12) at least in parts covering the largest longitudinal extent of the tile (1).

16. The tile according to claim 15, characterized in that the anti-breakage coating is provided in the area of the holding elements (4, 10, 11, 24) and covers these as well.

17. The tile according to claim 15, characterized in that the anti-breakage coating is made of a woven or nonwoven fabric of mineral fiber, preferably glass fiber, which is impregnated with an epoxy resin.

18. The tile according to claim 1 characterized in that the holding elements (4, 24) have a dome-shaped design.

19. The tile according to claim 1, characterized in that the side of the tile facing away from the visible side is provided, at least in the area of the holding elements, with a water-repellent coating impermeable to air, and with the water-repellent coating also covering the holding elements.

* * * * *